J. F. MacKAY & G. W. CISCO.
INCUBATOR.
APPLICATION FILED NOV. 3, 1917.
1,293,495.
Patented Feb. 4, 1919.
3 SHEETS—SHEET 1.
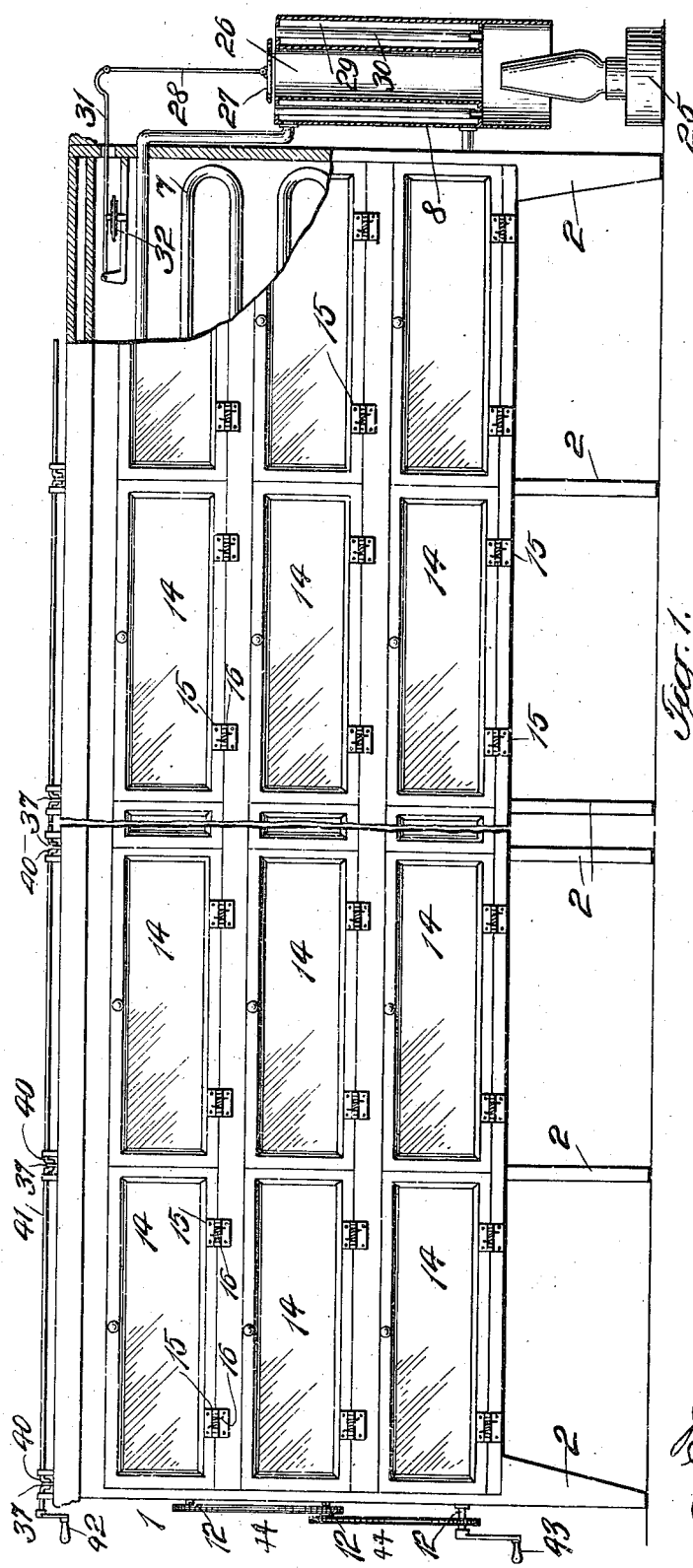
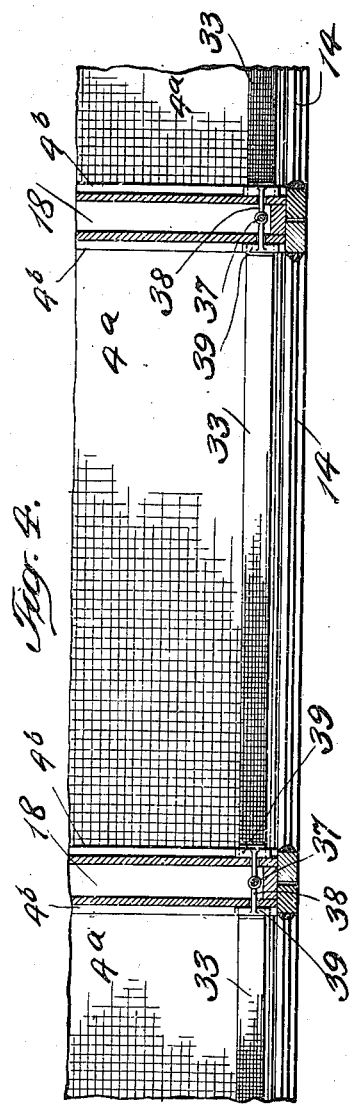
INVENTORS:
John F. MacKay
George W. Cisco
BY
Fred A. Tasker
ATTORNEY

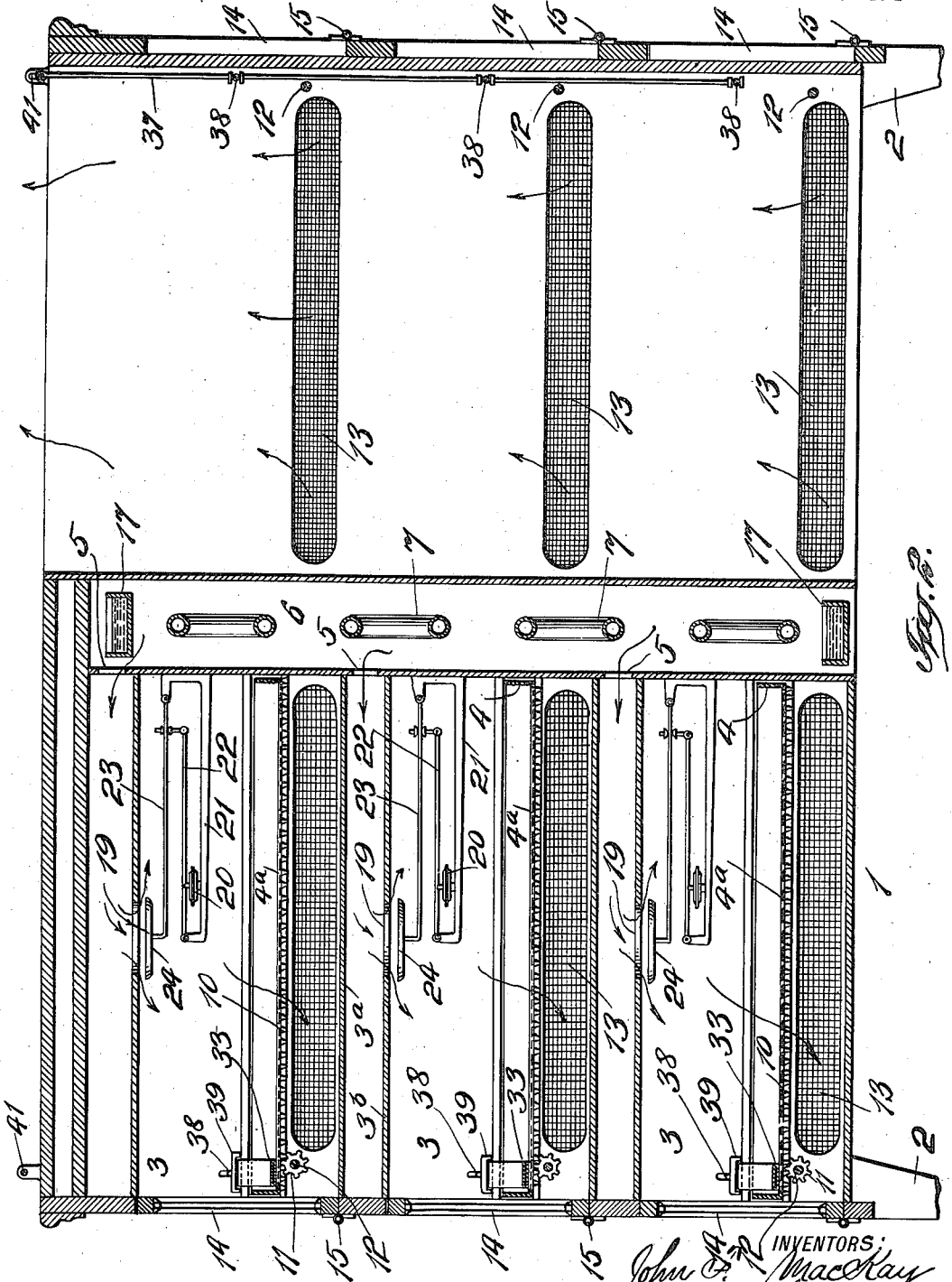

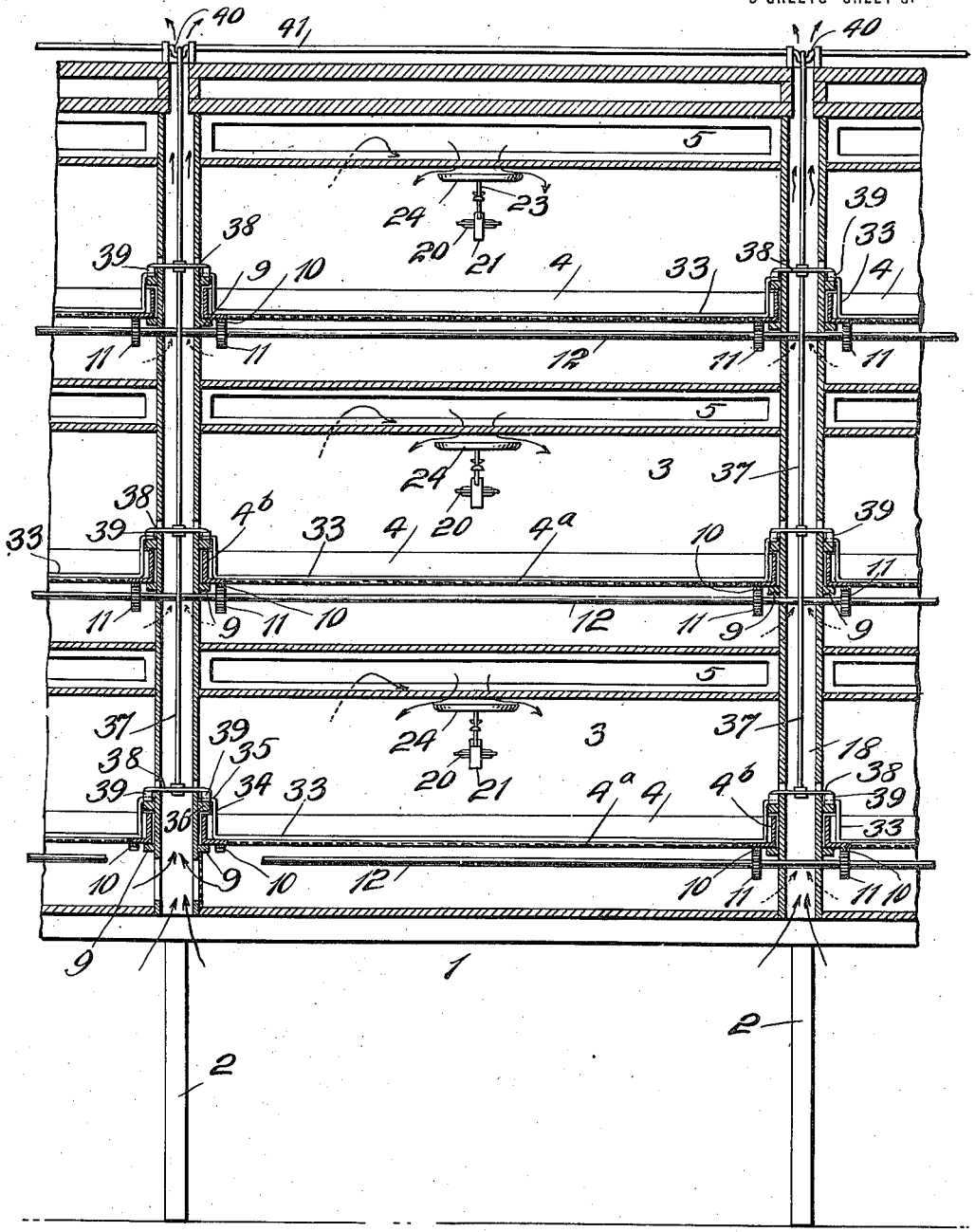

UNITED STATES PATENT OFFICE.

JOHN F. MACKAY, OF BORDENTOWN, AND GEORGE W. CISCO, OF HAWTHORNE, NEW JERSEY.

INCUBATOR.

1,293,495.        Specification of Letters Patent.        Patented Feb. 4, 1919.

Application filed November 3, 1917. Serial No. 200,157.

*To all whom it may concern:*

Be it known that we, JOHN F. MACKAY and GEORGE W. CISCO, citizens of the United States, and residents, respectively, of Bordentown and Hawthorne, in the counties of Burlington and Passaic and State of New Jersey, have invented certain new and useful Improvements in Incubators, of which the following is a specification, reference being had therein to the accompanying drawing.

Our present invention relates to certain novel and useful improvements in incubating apparatus for poultry raising. The object of the invention is to so construct the apparatus that it may be flexible in its capacity, being larger or smaller as may be required, depending upon the number of compartments; and may also be provided with suitable air and heat controlling means, as well as egg carrying and turning devices, whereby the best results may be secured in hatching. The invention, therefore, may be said to consist essentially in the construction, arrangement and combination of the various parts and in numerous details thereof substantially as will be hereinafter described and then more fully pointed out in the claims.

In the accompanying drawing illustrating our invention:

Figure 1 is a front elevation of our improved incubator with a portion broken away, and with the heater device in section.

Fig. 2 is a transverse sectional elevation.

Fig. 3 is a partial longitudinal section.

Fig. 4 is a partial horizontal section.

Similar characters of reference designate corresponding parts throughout the different figures of the drawings.

1 denotes the main frame. It is supported on legs 2, or otherwise, as preferred. Although the essential character of the invention is found in the explanation of a single compartment, yet we preferably construct the apparatus with a multiplicity of compartments arranged in several horizontal and vertical tiers as shown in Fig. 1; and, if desired, we also place these compartments in two or more groupings in the same apparatus or structure as indicated in Fig. 2, so that a larger capacity may be secured, coupled with ease of management and operation. These compartments, which are indicated by 3, are adapted to contain the eggs to be incubated, and to this end are supplied with suitable horizontal egg trays 4. These trays consist of a perforated or screen-like bottom 4ª, which is surrounded by a vertical ledge 4ᵇ running around all four sides, said bottom 4ª being of wire mesh or screening or some other substance which will allow the air to pass freely through it. The compartments 3 are, each, complete in themselves, and when arranged in vertical tiers, as shown in the drawing, are separated from each other by the horizontal floors 3ª, and the parallel horizontal top plates 3ᵇ, there being therefore between these members 3ª and 3ᵇ passages, at the ends of which are openings 5 into a space 6 between the front and rear groups of compartments in the form of the invention shown in Fig. 2, which space 6 is primarily adapted to contain water circulating pipes or air or other heating pipes 7, which supply heat to control the temperature of the air in the apparatus, which air reaches the eggs. These water circulating pipes 7 run from an external heater 8 which I shall presently describe. In space 6 are also moisture pans 6, if desired.

The egg trays 4 slide in and out on horizontal supports 9 on the side walls of the main frame of the apparatus, and they are provided on the underside with racks 10, preferably two of them, which are engaged by pinions 11 on shafts 12. By these means the rotation of the shafts will through the pinions and racks cause the egg trays to be moved forward and back. A joint movement of the several shafts 12 belonging to the different rows of compartments may be had by the use of any convenient connecting leverage or other mechanism, as for example the sprocket chains and wheels at 44 and the crank handle 43. The sides of the different compartments are provided with openings 13 covered with wire gauze or other protective fabric or material to exclude dust and dirt. The front of each compartment has a door 14 hinged at 15, the hinges 15 being preferably furnished with closing springs 16 so that the doors may be kept closed, but they can readily be opened at any time against the pressure of the springs. Obviously when the egg trays are moved forward and outward under the action of the mechanism just described they will automatically open the several doors 14 by pushing upon them, and when they are returned to their innermost position the doors 14 will be automatically closed by the springs.

In the space 6 between the front and rear groups of compartments 3, or elsewhere if desired, pans of water or moistened sand, or the like, as 17, are located so that the entering air may be moistened properly to produce the best effect in its influence upon the eggs. Between the tiers of compartments of the front or the rear group, we preferably leave spaces 18, forming vertical flues into which the air passes through the side openings 13 from the several compartments 3 as also through the open lower ends of said flues 18, and flowing upwardly goes out into the atmosphere. In the top plates 3$^b$ of the several compartments 3 are air inlet openings 19 through which the air flows from the spaces above the compartments and coursing along through comes into contact with the eggs, and then passes through the bottom of the egg trays and then out through the lateral openings 13 as we have just stated. In each compartment 3 is a thermostat 20 carried by a bracket 21 and controlling a lever 22 which acts upon another lever 23 carrying a valve cover or damper 24 which is adapted to close upwardly against and over the opening 19 and cut off the supply of hot air, whenever the temperature within the compartment reaches a predetermined degree for the best work; thus it will be seen that each compartment regulates its heat independently of all the others.

The heater 8 consists of a cylinder or barrel open at the lower end, at which point is a lamp 25 or other source of heat, such as a coal burning stove, gas jet or the like. Within the cylinder 8 is a central, concentric tube 26 through which the hot air passes upwardly and at the open end of which is a valve cover 27 carried by a rod 28. See Fig. 1. There is an annular water space 29 between the tube 26 and the outer barrel 6 of the heater, which water space is entered by the water-circulating pipes 7, so that the hot water may circulate back and forth through the apparatus. Within the annular water space 29 is a series of vertical hot-air pipes 30 running from the space which is in the lower end of the cylinder 8 around the lamp 25, upwardly to the top of the heater so that the hot air may pass through these pipes 30 from the heater upwardly and out into the atmosphere at certain times. Therefore, the water within the space 29 is heated by the hot air passing through tube 26 and also that passing through the smaller pipes 30. This takes place most effectively, of course, when the cover 27 is closed down upon the upper end of tube 26, for at that time the tube 26 fills with hot air and also the pipes 30. When the cover 27 is lifted the hot air will pass out of the upper end of the tube 26 and will not enter the tubes 30, so that the device will cool down.

The valve rod 28 is pivotally hung upon the end of an arm 31 operated by a thermostat 32 within some chamber of the apparatus which is exposed to heat so that said thermostat will expand when the temperature in the compartment rises to a predetermined degree, that is to say, the same degree which causes the other thermostats to close the several valves or dampers 24. In the particular example of the invention which we are now describing we have indicated in this way a separate thermostat 32 for operating the heater damper but obviously the levers for said damper might be connected with those of one or the other of the compartment thermostats and be operated thereby, thus simplifying the mechanism and economizing space and parts.

We will proceed now to describe how the eggs in the egg trays 4 are turned at intervals so as to enable them to be uniformly heated on all sides. In each one of the compartments is located a loose horizontal longitudinal bar or rod 33. This may be covered with felt or fabric to provide a rough, clinging surface if desired. These bars have their ends turned at right angles at 34, said right angled portions being bent at 35 so as to rest on the ribs 36 attached to the side walls of the compartment, on which ribs 36 these right-angled ends of the bars 33 slide at certain times, as we will explain. In the spaces 18, see Fig. 3, between the individual compartments of a row, we arrange vertical rods 37, to which are attached at intervals cross-pieces 38 which project into the compartments through slots in the wall of the compartments. The said projecting ends are formed with forks 39 of proper size and shape to embrace the end projections 35 of the bars 33. This takes place at certain times when it is desired to hold the bars 33 in a particular position but at other times the forks are released from the bars. The vertical rods 37 are connected at their upper ends to the crank portions 40 of a shaft 41 supported on the top of the apparatus and provided with a handle 42 by means of which the shaft can be rotated. Obviously the rotation of the shaft 41 will raise or lower the rods 37 and connect or disconnect the forks 39 with the ends of the horizontal bars 33.

When it is desired to turn the eggs, which must be done every two or three hours or at other suitable intervals, the attendant operates the crank handle 43 and in so doing moves the egg trays outwardly, thereby engaging and automatically opening the doors 14. At this time the bars 33 are held stationary in their outermost position, as shown in Fig. 2, by means of the forks 39. As the eggs in the bottom of the trays strike against the said stationary bars 33 said eggs will be turned more or less. When the turning is finished the handle will be rotated in the opposite direction and the trays restored to their former innermost position in their compartments. As the trays retreat into their compartments the doors 14 will automatically close under the action of their springs 16. Before retracting the trays, however, as it is not desired to turn the eggs again on the inner movement, the handle 42 will be operated for the purpose of disconnecting the forks 39 from the bars 33, and then the bars as they lie on the bottom of the trays and in the rear ends of the trays will be carried back with the trays, their end projections 35 running on the rods 36, and when the trays have been thus replaced in the compartment the bars 33 will obviously be at the rear ends. The next time it is necessary to turn the eggs the trays will be carried forward as before, until the bars 33 are brought to their forward position where they can be caught by the forks 39 and held in the position shown in Fig. 2, after which by again revolving the crank handle 43 the trays may be restored to their innermost position without carrying bars 33 with them, and as the latter are now held stationary the eggs will be turned as fast as they come into contact with the bars. Thus it will be seen that at one time the eggs will be turned on the outward movement of the trays, and the next time they are turned on the inward movement of the trays, because of the change of the position of the bars 33.

Many changes in the precise arrangement and combination of the various parts may be made without exceeding the scope of the invention.

Having thus described our invention, what we claim as new and desire to secure by Letters Patent, is:—

1. In an incubator, the combination with a compartment, of a sliding egg tray, means for operating it, an egg turning bar carried loosely in said tray and having angular end projections, stationary guides on the compartment on which the said projections slide, and means for locking the bar consisting of a vertically movable rod and means carried thereby for loosely engaging the said end projections.

2. In an incubator, the combination with a series of compartments, of sliding egg trays in said compartments, egg turning bars carried loosely in said trays, and means for holding said bars stationary at certain times when the trays are being moved so as to turn the eggs, said holding means consisting of yokes engaging the ends of the bars, vertically movable rods to which said yokes are attached, and means for moving said rods.

3. In an incubator, the combination of a series of compartments, sliding egg trays in said compartments, means for operating the trays, egg turning bars carried loosely in said trays, pairs of yokes engaging the ends of the turning bars in adjoining compartments cross-pieces which project into adjacent compartments through slots in the walls of the compartments and carry the yokes at each end, and vertically movable rods connected to and operating said cross pieces.

4. In an incubator, the combination with a compartment, of a sliding egg tray, means for operating it, an egg turning bar carried loosely in said tray and having end projections, stationary guides for said projections, and means for locking the bar, consisting of yokes engaging said end projections.

5. In an incubator, the combination with a compartment, of a sliding egg tray, means for operating it, an egg turning bar carried loosely in said tray and having end projections, stationary guides for said projections, and means for locking the bar, consisting of yokes engaging said end projections and rods to which said yokes are attached, together with means for reciprocating said rods having a crank shaft.

6. In an incubator, the combination with a compartment, of a sliding egg tray, means for operating it, an egg turning bar carried loosely in said tray and having right angled projections formed with horizontal projections, stationary guides on the sides of the compartment on which said horizontal projections slide, and means for locking the bar consisting of a cross piece carrying a yoke loosely engaging the end projections, and a vertically movable rod connected to and adapted to raise and lower said cross piece, together with means for actuating said rod.

In testimony whereof we hereunto affix our signatures.

JOHN F. MACKAY.
GEORGE W. CISCO.